United States Patent [19]

Spooner

[11] Patent Number: 4,788,895

[45] Date of Patent: Dec. 6, 1988

[54] SELF-ADJUSTING RESILIENT BAR STOCK SUPPORT

[76] Inventor: Richard C. Spooner, Guilford Rd., Durham, Conn. 06422

[21] Appl. No.: 77,684

[22] Filed: Jul. 24, 1987

[51] Int. Cl.⁴ .............................................. B23B 25/00
[52] U.S. Cl. .................................. 82/38 A; 82/38 R; 82/2.5
[58] Field of Search ...................... 82/38 R, 2.5, 38 A; 269/287, 254 R; 248/309.1, 49, 560

[56] References Cited

U.S. PATENT DOCUMENTS 3,954,031  5/1976  Tull et al. ............................ 82/38 A
4,445,697  5/1984  Evans ................................... 82/2.5

*Primary Examiner*—Frederick R. Schmidt
*Assistant Examiner*—Lawrence Cruz
*Attorney, Agent, or Firm*—John H. Crozier

[57] ABSTRACT

A bar stock support comprises a tubular member with resilient means extending radially inwardly from the inner wall of said tubular member toward the major axis of said tubular member to define a generally cylindrical channel having a diameter smaller than at least the largest cross-sectional dimension of the smallest said bar stock to be supported, so that at least some of said resilient means is deformed by said bar stock. Said resilient means has sufficient resistance when deformed to support said bar stock generally concentrically within said tubular member and to resist movement of said bar stock radially within said bar stock support. In a preferred embodiment, said resilient member comprises a helix of bristles disposed within said tubular member.

9 Claims, 1 Drawing Sheet

SELF-ADJUSTING RESILIENT BAR STOCK SUPPORT

BACKGROUND OF THE INVENTION

1. Field of the Invention

The present invention relates to bar stock supports in general and more particularly to a novel bar stock support that has a self-adjusting resilient member which is able to support bar stock of differing diameters and differing transverse cross-sectional shapes.

2. Background Art

Many automatic and manual machine tools are of the type in which the feed material is a metal bar, or bar stock, of a length considerably greater than the parts to be produced from it. Since the manufacturing operation takes place at one end of the bar stock while it is rotating clamped in a chuck mechanism, it is necessary, of course, that the entire length of stock rotate. Typically, the stock is fed to the chuck though a cylindrical spindle in the headstock of the machine tool, and while the inside diameter of the spindle may be such that it may closely fit the outside diameter of the largest bar stock to be used, it is not practical to change headstocks when bar stock of other diameters is to be used. When smaller bar stock is held in the chuck mechanism and rotated, the bar stock within the spindle tends to whip out of concentric rotation and the resulting whipping can cause poor surface finish on the machined parts, can create undesirable noise, and can cause poor control of the machining operation. These problems may exist even with whip control guides placed near the inlet end of the spindle and are aggravated by any nonuniformity of the bar stock.

The conventional method of reducing whipping of bar stock in the spindle of a machine tool is to provide a cylindrical "filler tube" or "spindle liner" for each size of bar stock to be used. This spindle liner has an outer diameter equal to that of the inner diameter of the spindle and an inner diameter approximating that of the nominal outside diameter of the bar stock, in order to concentrically fill the annular space between the bar stock and the spindle. While this arrangement is satisfactory for some applications, in some cases it does not compensate sufficiently for the difference in diameters between the bar stock and the spindle and/or for nonuniformities in the bar stock, and some whipping or vibration may be experienced nevertheless. In all cases, providing spindle liners for a large number of bar stock sizes is expensive.

Additionally, working in tandem with the machine tool is a bar feeding or support device which holds and guides the bar stock to the inlet end of the headstock of the machine tool. Because the bar stock is rotating within the feeder, there is similar further aggravation of the problems discussed above with reference to headstock spindles. Such bar stock feeders may be of the oil-feed type, in which case the bar stock is reasonably well supported and thus the above problems may be somewhat minimized. Typically, however, because of a substantial cost differential, the feeder is of the pneumatic type, in which case, the above problems fully exist.

Attempts have been made to address the problem of supporting rotating bar stock without resort to the use of a separate spindle liner for each size of bar stock. One approach is described in U.S. Pat. Nos. 1,786,876 and 1,935,999 to K. Tessky. These show various configurations of metal springs inserted in the tube of a bar stock feeder. Another approach is described in U.S. Pat. No. 4,058,036 to Austin and in U.S. Pat. No. 4,149,437 to Winberg et als. Each of the latter patents shows spindle or feeder tube support devices which have hinged, self-adjusting members disposed within a tube, which members apply pressure to, and thereby concentrically support, a bar stock inserted therein over a range of bar stock sizes. Since neither of these approaches is known to be in general use, it may be assumed that each has inherent performance and/or cost disadvantages.

Accordingly, it is a principal object of the present invention to provide a self-adjusting bar stock support to minimize whipping and other undesirable radial or lateral motion of the bar stock.

It is another object of the present invention to provide a self-adjusting bar stock support which can accommodate different diameter bar stock, bar stock of different transverse cross-sectional shapes, and bar stock having nonuniformities, all with one size support.

It is another object of the present invention to provide a self-adjusting bar stock support which is economical and of simple manufacture.

Other objects of the present invention will in part be apparent and will in part appear in the following description.

SUMMARY OF THE INVENTION

The present invention achieves the above objects by providing a bar stock support comprising a resilient structure mounted in a cylindrical tube, which structure preferably extends substantially toward the central axis of the tube. A bar stock of any shape and within a wide range of dimensions placed within the tube deflects the resilient structure, thereby conforming it to its dimensions. While the resilient structure deflects to accommodate the bar stock, it has sufficient stiffness that any tendency of the bar stock to whip or otherwise radially move is resisted and, therefore, minimized. Additionally, nonuniformities in the bar stock are easily accommodated by the resilient structure. In an embodiment described, the resilient structure is rooted in a helically coiled metal channel which may be threaded into a corresponding groove formed on the inside of the tube. The tube may be used in the spindle of a machine tool for bar stock support, may be used as a support mechanism in a pneumatic bar stock feeder, or may be used in any application where it is necessary to support bar stock of varying shapes and diameters, rotating or not.

DETAILED DESCRIPTION OF THE PREFERRED EMBODIMENTS

Figure 1:
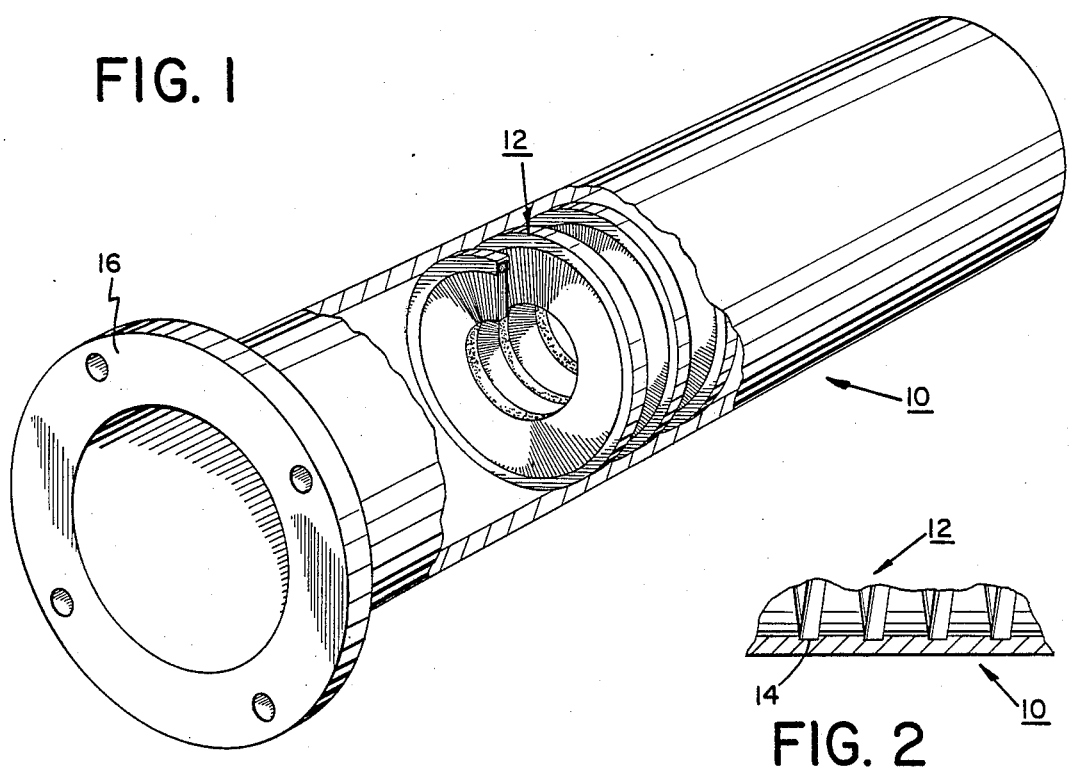
FIG. 1 is a partially cutaway perspective view of a support tube including the present invention.
Figure 2:
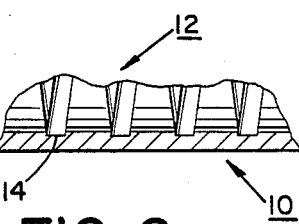
FIG. 2 shows a detail of FIG. 1.

Referring now to the Drawing, FIGS. 1 and 2 show a tube, generally indicated by the reference numeral 10, including a helically-wound bristle structure of the present invention, generally indicated by the reference numeral 12. Tube 10 preferably has a helical groove, as at 14, on the inside surface thereof to engage, and hold in place, the bristle structure, although other means could be provided to hold bristle structure 12 within tube 10, such as cementing with an appropriate glue material or other bonding means such as by brazing or welding through holes in the wall of tube 10. Bristle structure 12 preferably extends throughout tube 10, but can, if desired, comprise two or more separate sections disposed within the tube, if sufficient support for the bar stock can be provided. One end of tube 10 may include a flange 16 fixedly attached thereto for attachment to the inlet end of a spindle of a machine tool or to an end of a bar stock feeder (neither shown).

Figure 3:
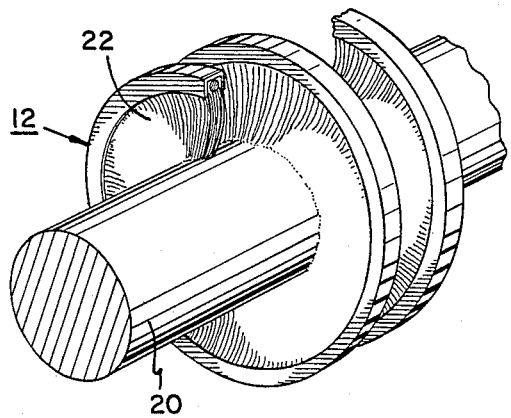
FIG. 3 shows a section of the bristle structure of the present invention supporting cylindrical bar stock of a smaller diameter.
Figure 4:
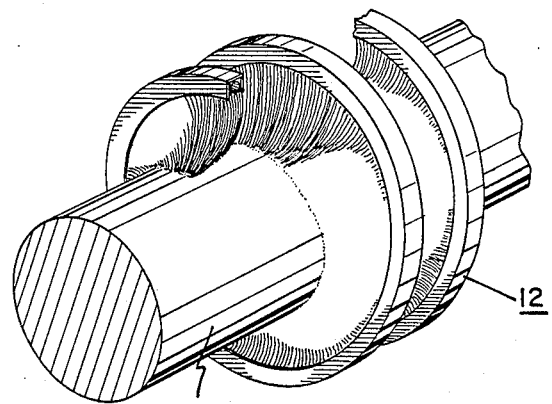
FIG. 4 shows a section of the bristle structure of the present invention supporting cylindrical bar stock of a larger diameter.

Reference now should be made to FIGS. 3 through 6 for greater understanding of the construction of bristle structure 12 and the manner in which it supports bar stock. FIG. 3 shows bristle structure 12 supporting a smaller size cylindrical bar stock 20, which deforms bristles 22. Although bristles 22 are deformed to configure themselves to the outer diameter of bar stock 20, they have sufficient stiffness that they are able to hold the bar stock closely concentrically in tube 10. FIG. 4 shows bristle structure 12 supporting a larger size cylindrical bar stock 24 which, of course, deforms bristles 22 to a greater extent than bar stock 20 of FIG. 3. The greater deformation in this case causes bristles 22 to press against bar stock 24 with greater force, thus compensating for the presumably greater weight of the bar stock.

Figure 5:
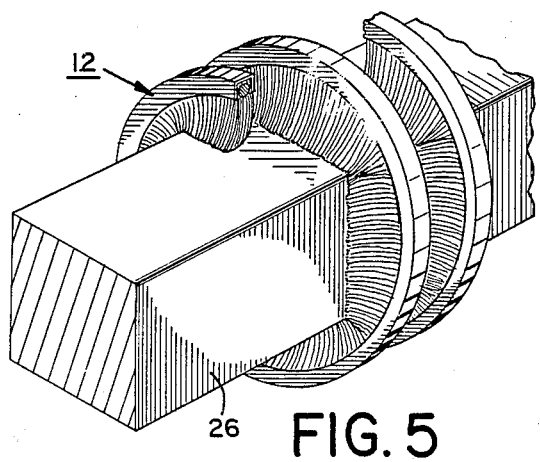
FIG. 5 shows a section of the bristle structure of the present invention supporting square bar stock.

FIG. 5 shows the same bristle structure 12 supporting a square bar stock 26 and illustrates how the bristle structure can accomodate bar stock of varying transverse cross-sectional shapes, which, of course, are not limited to those shown. It will be appreciated, also, that bristle structure 12 can easily accommodate nonuniformities in the bar stock. Depending on the particular non-cylindrical bar stock, it may not be necessary that bristles 22 fully contact the outer perimeter of the bar stock, but contact of the bristles with only the larger cross-sectional dimension(s) may be sufficient to support the bar stock.

Figure 6:
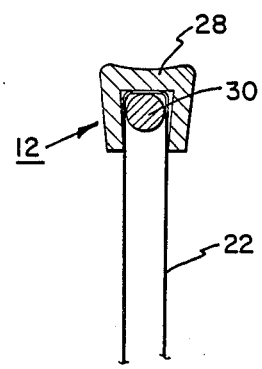
FIG. 6 is a cross-sectional view of the bristle structure of the present invention.

FIG. 6 is a cross-sectional view of bristle structure 12 which shows one construction thereof. Bristles 22 are inserted into a channel-shaped member 28 and are held therein by a wire 30 and by the slight deformation inward of the walls forming the channel-shaped member. Such a bristle structure is available in linear form from, for example, The Fuller Brush Company. The practicing of the present invention is not limited to the specific bristle structure, shown, nor even to a bristle structure, it being within the scope of the invention to employ any structure having resilient means extending substantially inward form the wall of a tubular member.

Support of any bar stock by bristle structure 12 in a position substantially coaxial with tube 10 occurs through the physical principle that when a thin rod (here, a bristle) is bent, the force, within certain limits, resisting the bending increases as the degree of bending is increased. Thus, when there is a tendency for any bar stock to whip or otherwise move in an radial direction, bristles 22 will increase the force on the bar stock to oppose such whipping or other motion.

Tube 10 is preferably formed of any suitable metal or of a rigid plastic. Bristles 22 may also be formed of any suitable material which will not mar the surface of the bar stock and which provides the proper combination of resiliency and resistance, and are preferably formed of polypropylene or a similar material. In the embodiment shown, channel-shaped member 28 and wire 30 may be formed of any metallic or polymeric material known to provide the required characteristics to maintain bristles 22 in position.

It will thus be seen that the objects set forth above, among those made apparent from the preceding description, are efficiently attained and, since certain changes may be made in the above construction without departing from the scope of the invention, it is intended that all matter contained in the above description or shown on the accompanying Drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. A bar stock support, comprising:
   (a) a tubular member;
   (b) resilient means extending radially inwardly from the inner wall of said tubular member toward the major axis of said tubular member to define a generally cylindrical channel having a diameter smaller than at least the largest crosssectional dimension of the smallest said bar stock to be supported, so that at least some of said resilient means is deformed by said bar stock; and
   (c) said resilient means having sufficient resistance when deformed to support said bar stock generally concentrically within said tubular member and to resist movement of said bar stock radially within said bar stock support, said resilient means comprises at least one bristle structure, said bristle structure comprises bristles fixed in a channel structure in the form of a helix fixed to the inside surface of said tubular member.

2. A bar stock support, as defined in claim 1, wherein said resilient means can support bar stock of different diameters and different cross-sectional shapes.

3. A bar stock support, as defined in claim 1, wherein said bar stock support is adapted to be mounted in a tool machine spindle.

4. A bar stock support, as defined in claim 1, wherein said bar stock support is adapted to be mounted in a bar stock feeder.

5. A bar stock support, as defined in claim 1, wherein said helix is held within a groove formed on the inside of said tubular member.

6. A bar stock support, as defined in claim 1, wherein said helix is welded or brazed to said tubular member.

7. A bar stock support, as defined inn claim 1, wherein said helix is cemented to said tubular member.

8. A bar stock support, as defined in claim 1, wherein the bristles of said bristle structure are formed from polypropylene.

9. A bar stock support, as defined in claim 1, wherein said bristle structure extends substantially throughout said tubular member.

* * * * *